US006944528B2

(12) United States Patent
Nagano

(10) Patent No.: US 6,944,528 B2
(45) Date of Patent: Sep. 13, 2005

(54) WIRELESS COMMUNICATION SYSTEM FOR VEHICLE

(75) Inventor: Tetsuji Nagano, Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 56 days.

(21) Appl. No.: 10/638,536

(22) Filed: Aug. 12, 2003

(65) Prior Publication Data

US 2004/0043802 A1 Mar. 4, 2004

(30) Foreign Application Priority Data

Sep. 2, 2002 (JP) ....................................... 2002-256904

(51) Int. Cl.[7] ............................ G07C 9/00; G06F 19/00

(52) U.S. Cl. ....................... 701/49; 701/36; 340/426.16; 340/426.36

(58) Field of Search .................... 701/36, 49; 307/10.1; 340/426.13, 426.16, 426.17, 426.36

(56) References Cited

U.S. PATENT DOCUMENTS

| | | | | |
|---|---|---|---|---|
| 4,240,516 A | | 12/1980 | Henderson et al. | |
| 5,381,065 A | | 1/1995 | Jones | |
| 5,698,907 A | | 12/1997 | Weber | |
| 5,751,073 A | * | 5/1998 | Ross | 307/10.5 |
| 6,218,929 B1 | * | 4/2001 | Furuta et al. | 340/5.2 |
| 6,304,168 B1 | * | 10/2001 | Ohta et al. | 340/5.72 |
| 6,359,348 B1 | * | 3/2002 | King | 307/10.1 |

FOREIGN PATENT DOCUMENTS

| | | |
|---|---|---|
| EP | 0 886 025 A2 | 12/1998 |
| EP | 0 965 710 A2 | 12/1999 |
| EP | 1 079 053 A2 | 2/2001 |
| EP | 1 099 812 A2 | 5/2001 |
| JP | 10-131569 A | 5/1998 |

OTHER PUBLICATIONS

Patent Abstracts of Japan, vol. 006, No. 029, Feb. 20, 1982, JP 56–146442, Nov. 13, 1981.

* cited by examiner

*Primary Examiner*—Michael J. Zanelli
(74) *Attorney, Agent, or Firm*—Foley & Lardner LLP

(57) ABSTRACT

A wireless communication system for a vehicle, including: a portable transmitter-receiver adapted to communicate information wirelessly; a main controller mounted on the vehicle, the main controller adapted to communicate information wirelessly with the portable transmitter-receiver, to determine whether the portable transmitter-receiver is located within a communicatable range, and to output an enable signal when the portable transmitter-receiver is located within the communicatable range; a sub-controller mounted on the vehicle and connected to the main controller, the sub-controller adapted to enable-control of a vehicle mounted electronic device when the enable signal is input from the main controller.

6 Claims, 5 Drawing Sheets

WIRELESS COMMUNICATION SYSTEM FOR VEHICLE

BACKGROUND OF THE INVENTION

1. Field of the Invention

The present invention relates to a wireless communication system for vehicles such as keyless entry system for remotely controlling an electric device mounted on the vehicle such as door locking/unlocking device and power window actuator, by checking on an ID code without using a key.

2. Description of the Related Art

In a related art, a wireless communication system for vehicles for remotely controlling an electric device mounted on the vehicle by checking on an ID code is disclosed in Japanese unexamined Patent publication JP-A-10-131569. The disclosure of the publication will be briefly described herein below.

As shown in FIGS. 5 and 6, operating switches (a door locking switch 1*a* and a door unlocking switch 1*b*), a transmission circuit 2*a*, an ID code memory 2*b*, and an antenna 2*c* are provided at a grip section of a portable key 1. When either of the operating switches 1*a* and 1*b* is turned on, the transmission circuit 2*a* reads an ID code from the ID code memory 2*b*. While a function code (which is set in association with the function of the switch which has been turned on) is added to the ID code, the ID code with the function code is transmitted as a radio wave from the antenna 2*c* to a receiver (not shown) mounted on a vehicle. Upon receipt of the ID code and the function code, the receiver performs locking or unlocking of a door or actuates a power window function to move a glass window up or down.

That is, when either of the operating switches 1*a* and 1*b* of the portable key 1is turned on, locking or unlocking of a door is performed by a reception circuit fixedly provided on the vehicle, in accordance with the function of the switch.

When an operation on either of the operating switches 1*a* and 1*b* within a predetermined time after locking or unlocking the door manually is performed, it is judged to be a request for locking or unlocking the door. When the operation continues for a time in excess of the predetermined time, it is judged to be a request for moving up or down a glass window using the power window function. In the condition that the door is in an unlocked state only within the predetermined time after the door is unlocked, the glass window is moved down by the power window function, and in the condition that the door is in a locked state only within the predetermined time after the door is locked, the window glass is moved up by the power window function.

The device, however, has given a sense of inconvenience because the portable key 1 is provided with the operating switches 1*a* and 1*b* so that either of the operating keys 1*a* and 1*b* must be externally operated with a finger tip or the like to be turned on.

Under such circumstances, recently, there have been made proposals for keys without the operating switches 1*a* and 1*b* which keys are so-called electronic keys and devices which are generally called passive keyless entry devices (also called smart keyless entry devices). In these proposals, an ID code is periodically transmitted from a portable key to a receiver without any switch operation, so that the receiver automatically checks the ID code in order to judge whether the key is valid or invalid.

Since this arrangement allows a door to be automatically locked and unlocked without need for the driver to operate a key, the driver's both hands becomes free so that the driver can do various things freely without touching the door or the key.

Such passive keyless entry device may be provided with the power window function. In this case, for example, arrangement may be conceived such that the power window function is enabled for a predetermined time after the driver pulls out the key from an ignition key cylinder to get off the vehicle. How to set the predetermined time to enable the power window function, however, becomes a problem in this case.

For example, the driver becomes free to do some work with a door open for the predetermined time. Therefore, when the driver leaves the vehicle immediately after opening the door with the predetermined time set, for example, at 30 seconds, the state in which the glass window is left open continues for 30 seconds. It cannot be said that this state is preferable for security, in general.

On the other hand, when assumed that the driver gets off the vehicle after doing some work on the seat for about 30 seconds after removing the key, and thereafter attempts to actuate the power window function to put things on the rear seat in order with the door and the glass window left open. In this case, the power window function cannot be actuated, so that it has been necessary to repeat the operation of inserting the key into the ignition key cylinder again to turn on the ignition switch.

A possible solution to the problem may be a system in which an ID code is checked after a press on a power window switch is detected and the power window function is enabled when the check provides a positive result. The check, however, involves a certain amount of time so that timeliness is spoiled due to occurrence of a time loss before the power window is actuated. This may make the driver impatient and result in problems such as damage to salability.

SUMMARY OF THE INVENTION

It is therefore an object of the invention to provide a wireless communication system for vehicle that extends the operating time of a power window function when an electronic key is provided with a power window control function.

In order to achieve the object, according to one aspect of the invention, there is provided a wireless communication system for a vehicle, including: a portable transmitter-receiver adapted to communicate information wirelessly; a main controller mounted on the vehicle, the main controller adapted to communicate information wirelessly with the portable transmitter-receiver, to determine whether the portable transmitter-receiver is located within a communicatable range, and to output an enable signal when the portable transmitter-receiver is located within the communicatable range; a sub-controller mounted on the vehicle and connected to the main controller, the sub-controller adapted to enable control of a vehicle mounted electronic device when the enable signal is input from the main controller.

When the sub-controller further includes an operation input section for controlling the vehicle mounted electronic device, and an operable time of the operation input section is extended by a predetermined time while the sub-controller continuously receives the instruction from the main controller, convenience can be improved.

When the actuator is set as a motor for driving a power window and the operation input section is set as a power window switch, the power window can be easily used at any time even in the case where a driver has done some work after turning off the ignition switch or has done some work in the vicinity of the door left open. Accordingly, convenience can be improved.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
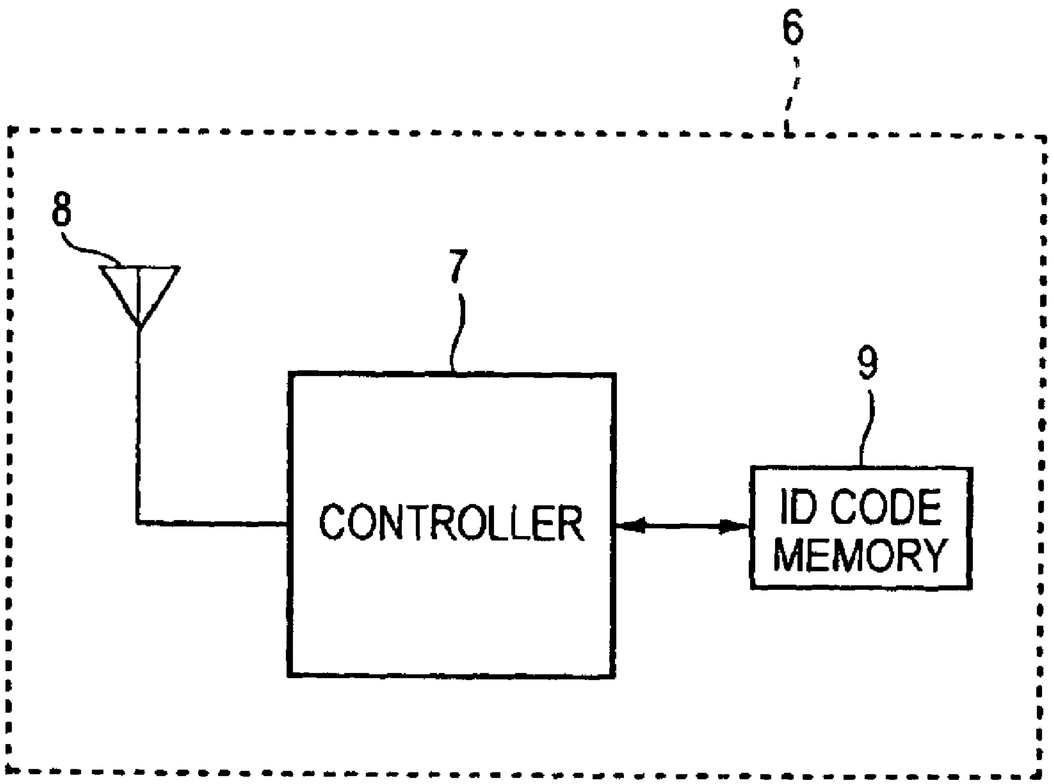
FIG. 1 is a circuit block diagram of a portable key according to one embodiment of the invention.
Figure 2:
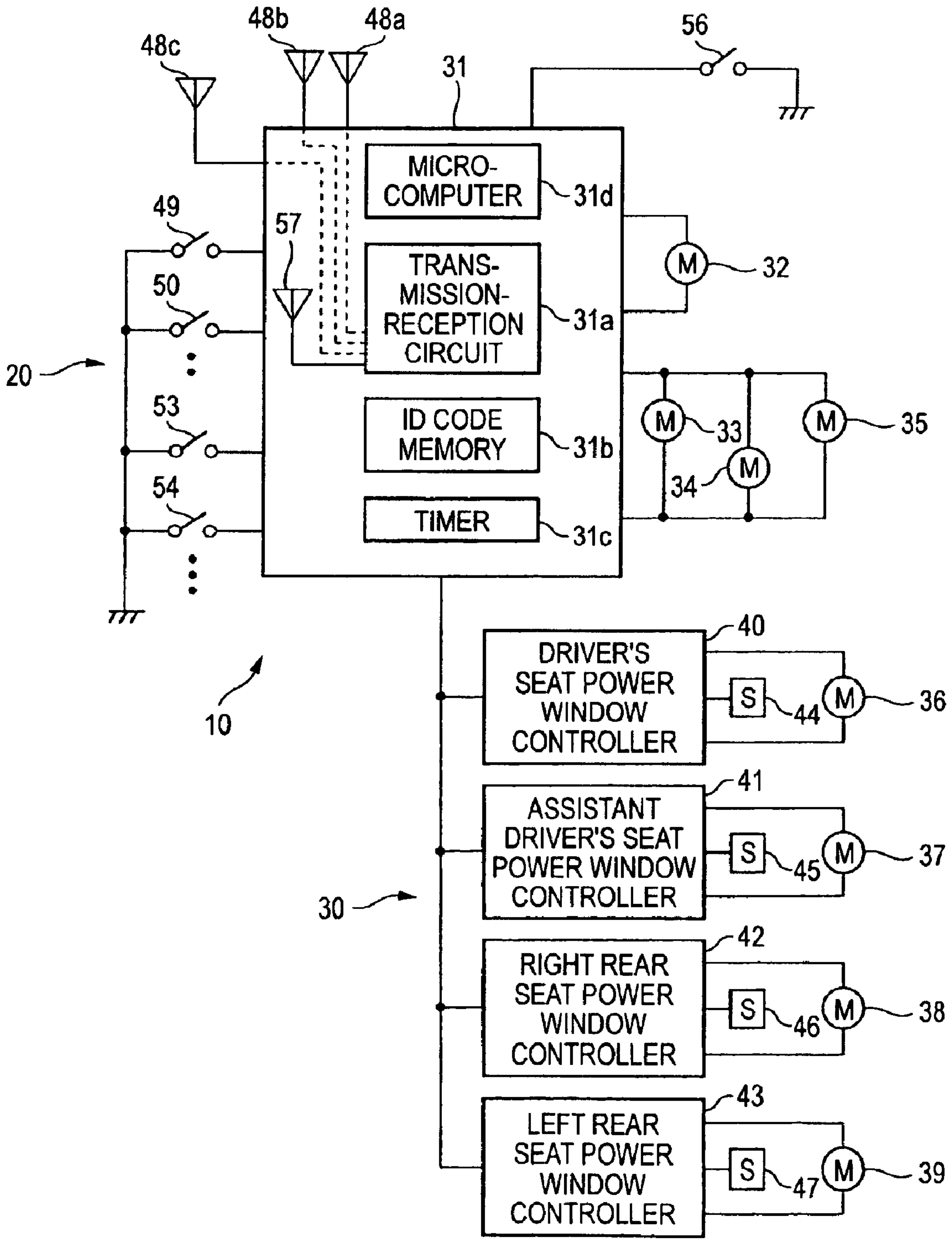
FIG. 2 is a circuit block diagram of a device loaded on a vehicle for explaining a configuration of the embodiment of the invention.

FIG. 1 is a circuit block diagram of a portable transmitter-receiver (hereinafter referred to as portable key) 6 as for an embodiment of the invention. FIG. 2 is a circuit block diagram of an on-vehicle device 10 including a transmitter-receiver controller (main controller) 20 mounted on a vehicle, and a peripheral circuit (sub-controller) 30.

As shown in FIG. 1, the portable key 6 includes a controller 7 having a microcomputer, an antenna 8 and an ID code memory 9. The portable key 6 communicates with the transmitter-receiver controller 20 of the on-vehicle device 10 shown in FIG. 2 and does not include the operating switches 1*a* and 1*b* described in the related art.

The ID code memory 9, which is a nonvolatile memory in which an ID code set uniquely to each portable key is stored, is connected to the controller 7. The antenna 8 is also connected to the controller 7.

As shown in FIG. 2, the on-vehicle device 10 includes a main controller 31.

The main controller 31 includes a transmission/reception circuit 31*a*, an ID code memory 31*b*, a timer (30 seconds timer) 31*c*, and a microcomputer 31*d*. The microcomputer 31*d* generates control signals for controlling a function of locking or unlocking a driver's seat door, an assistant driver's seat door and left and right rear seat doors. The microcomputer 31*d* also generates control signals for controlling a power window function of each of the doors to move up or down a glass window.

A driver's seat side antenna 48*a*, an assistant driver's seat side antenna 48*b*, and an interior antenna 48*c* are connected to the main controller 31. A request signal for requesting a transmission of information such as the ID code from the portable key 6 is output from the main controller 31 to the driver's seat side antenna 48*a*, the assistant driver's seat side antenna 48*b* and the interior antenna 48*c*. A response signal transmitted from the portable key 6 through the driver's seat side antenna 48*a*, the assistant driver's seat side antenna 48*b* and the interior antenna 48*c* in response to the request signal is received by a built-in antenna 57. The response signal thus received is demodulated by the transmission-reception circuit 31*a* and supplied to the microcomputer 31*d*.

The ID code memory 31*b* is made of a nonvolatile memory such as an EEPROM (Electronically Erasable and Programmable ROM). An ID code set and registered in advance so as to be peculiar to the transmitter-receiver controller 20 is stored in the ID code memory 31*b* (so that the ID code matches with the ID code stored in the ID code memory 9 of the portable key 6).

When an ignition switch 56 provided in a key cylinder of the vehicle is turned off as a result of a key operation by the driver, the turning-off is detected by the microcomputer 31*d*. Upon the detection, the microcomputer 31*d* instructs the timer 31*c* to start a timing operation. The transmitter-receiver controller 20 supplies the power window controller 30 with an enable signal for enabling a power window function for a predetermined timer time. When the timer time reaches a predetermined time (e.g. 30 seconds) the microcomputer 31*d* stops (or inhibits) the output of the enable signal.

As describe above, the microcomputer 31*d* is connected to the transmission-reception circuit 31*a* for demodulating the response signal input from the portable key 6 and is connected to the ID code memory 31*b* and the timer 31*c*. The microcomputer 31*d* is also connected to switches 49 and 50 for detecting locked states of the driver's seat side door and the assistant driver's seat side door respectively and is connected to switches 53 and 54 for detecting open states of the driver's seat side door and the assistant driver's seat side door respectively. In addition, a driver's seat power window controller 40, an assistant driver's seat power window controller 41, a right rear seat power window controller 42, a left rear seat power window controller 43 and actuators 32 to 35 for locking and unlocking the doors respectively are connected to the microcomputer 31*d*.

The microcomputer 31*d* actuates the door locking and unlocking function that has been heretofore commonly performed to control the operations of the door locking/unlocking actuators 32 to 35. The micro-computer 31*d* also actuates the power window function according to the invention to control the operations of the driver's seat power window controller 40, the assistant driver's seat power window controller 41, the right rear seat power window controller 42 and the left rear seat power window controller 43.

Incidentally, the driver's seat side antenna 48*a* is provided so that an area ranging from a neighbor of the driver's seat to a neighbor of the right rear seat to cover a right half of an exterior portion of the vehicle is set as a communication area. The assistant driver's seat side antenna 48*b* is provided so that an area ranging from a neighbor of the assistant driver's seat to a neighbor of the left rear seat to cover a left half of the exterior portion of the vehicle is set as a communication area. The interior antenna 48*c* is provided so that an interior area of the vehicle is set as a communication area.

When the microcomputer 31*d* detects that the ignition switch 56 is turned off, the microcomputer 31*d* supplies enable signals to the driver's seat power window controller 40, the assistant driver's seat power window controller 41, the right rear seat power window controller 42 and the left rear seat power window controller 43 respectively for the timer time decided by the timer 31*c*. The enable signals enable the functions of the driver's seat power window controller 40, the assistant driver's seat power window controller 41, the right rear seat power window controller 42 and the left rear seat power window controller 43 respectively.

After the enable signals are output once, and while the ID code agrees with the ID code stored in the ID code memory 31*b*, the microcomputer 31*d* supplies a request signal to the driver's seat side antenna 48*a*, the assistant driver's seat side antenna 48*b* and the interior antenna 48*c* through the transmission-reception circuit 31*a* and sends the request signal to the portable key 6 in order to request the portable key 6 to send the ID code of the portable key 6 in a predetermined period (shorter than the timer time).

When the portable key 6 is located in the inside or vicinity of the vehicle, upon reception of the request signal, the controller 7 of the portable key 6 transmits the response signal to the driver's seat side antenna 48*a*, the assistant driver's seat side antenna 48*b* and the interior antenna 48*c*. When the built-in antenna 57 receives the response signal, the main controller 31 compares an ID code forming the response signal with the ID code set, registered, and stored in the ID code memory 31*b*. When the ID code of the response signal agrees with the ID code of the ID code memory 31*b*, the main controller 31 makes a decision that the ID code is a valid ID code, and supplies enable signals to the driver's seat power window controller 40, the assistant driver's seat power window controller 41, the right rear seat power window controller 42 and the left rear seat power window controller 43 respectively. The enable signals enable the functions of the driver's seat power window controller 40, the assistant driver's seat power window controller 41, the right rear seat power window controller 42 and the left rear seat power window controller 43 respectively.

Upon reception of an end-of-timer-time signal from the timer 31*c* when the ID codes agree with each other, the microcomputer 31*d* sends another request signal to the portable key 6. The sending operation is repeated until the ID code of the response signal sent in response to the request signal disagrees from the ID code of the ID code memory 31*b* or cannot be received, so that the timer time in the invention is extended.

When the ID code does not agree with the ID code stored in the ID code memory 31*b* or cannot be received, the output of the enable signals is inhibited to disable the power window function.

The driver can operate the power windows while the microcomputer 31*d* supplies the enable signals to the driver's seat power window controller 40, the assistant driver's seat power window controller 41, the right rear seat power window controller 42 and the left rear seat power window controller 43 respectively.

Incidentally, as described above, the microcomputer 31*d* has the function for locking and unlocking the doors under remote radio control as a (known) function separate from the power window function. When the received ID code agrees with the registered ID code, the microcomputer 31*d* determines the on/off states of the switches 49, 50, 53, and 54 and selects one of the door locking/unlocking actuators 32 to 35 to lock or unlock the door. No detailed description will be particularly made on the function because a lot of examples of the function have been already known.

Figure 3:
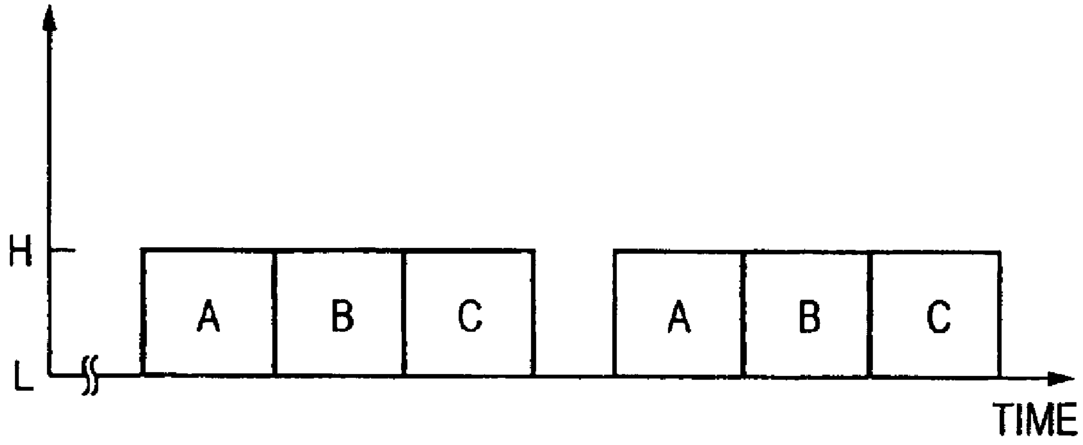
FIG. 3 is an explanatory view for explaining a configuration of a response signal.

Incidentally, the format of the response signal exchanged between the portable key 6 and the transmitter-receiver controller 20 is constituted by serial data having sections A, B, and C (see FIG. 3). The section A is a header of the data. The section B is a peculiar ID code set for the portable key 6. The section C is a vehicle code.

When the main controller 31 of the transmitter-receiver controller 20 supplies a request signal to the portable key 6, the portable key 6 transmits a continuous code composed of the sections A, B, and C.

Figure 4:
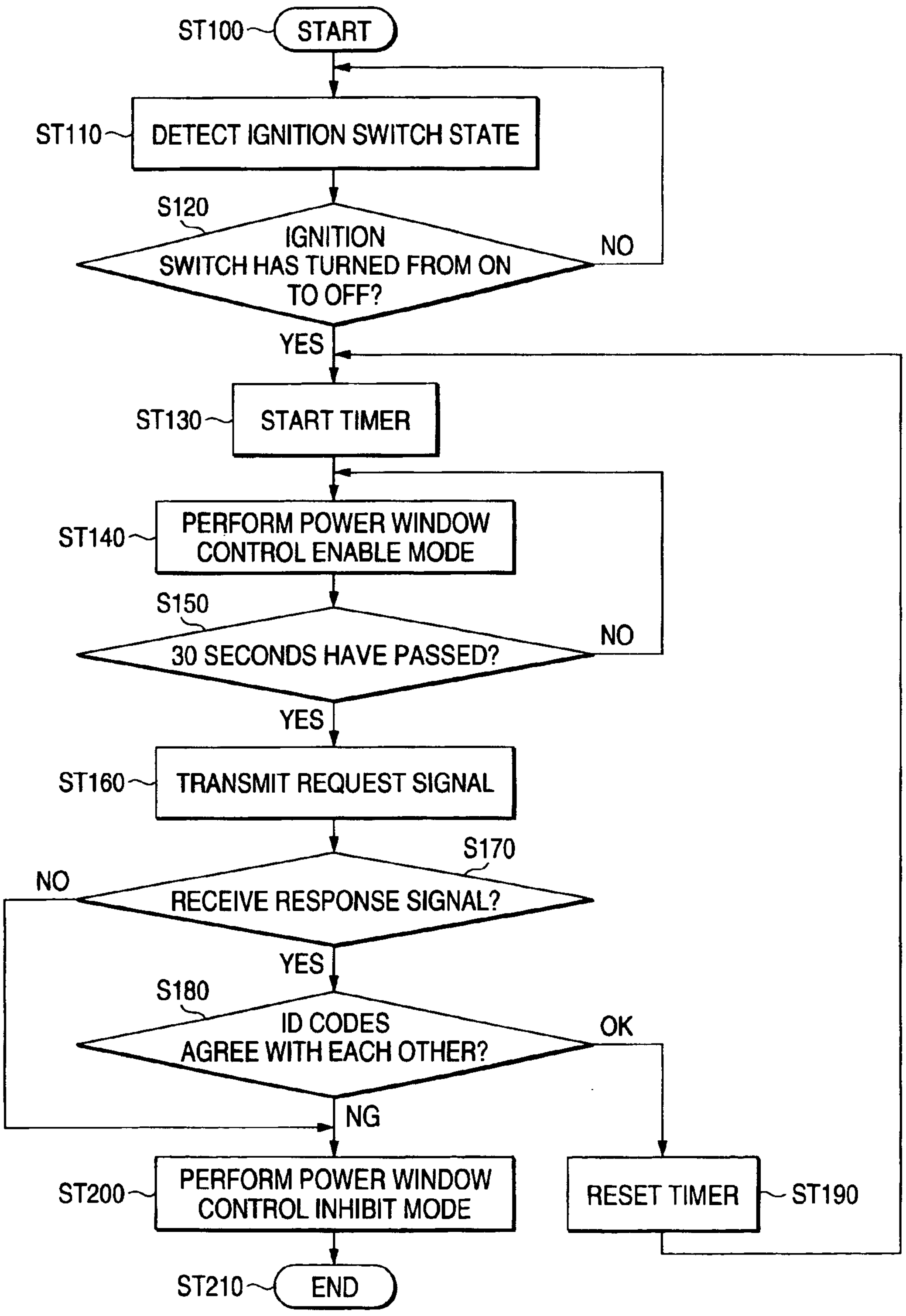
FIG. 4 is a flow chart for explaining an operation of the portable key according to the embodiment shown in FIG. 2.
Figure 5:
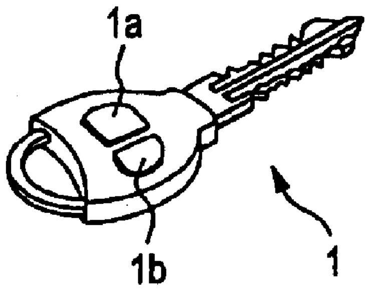
FIG. 5 PRIOR ART
FIG. 5 is an explanatory view of a portable key constituting a portable transmitter for explaining a related art.
Figure 6:
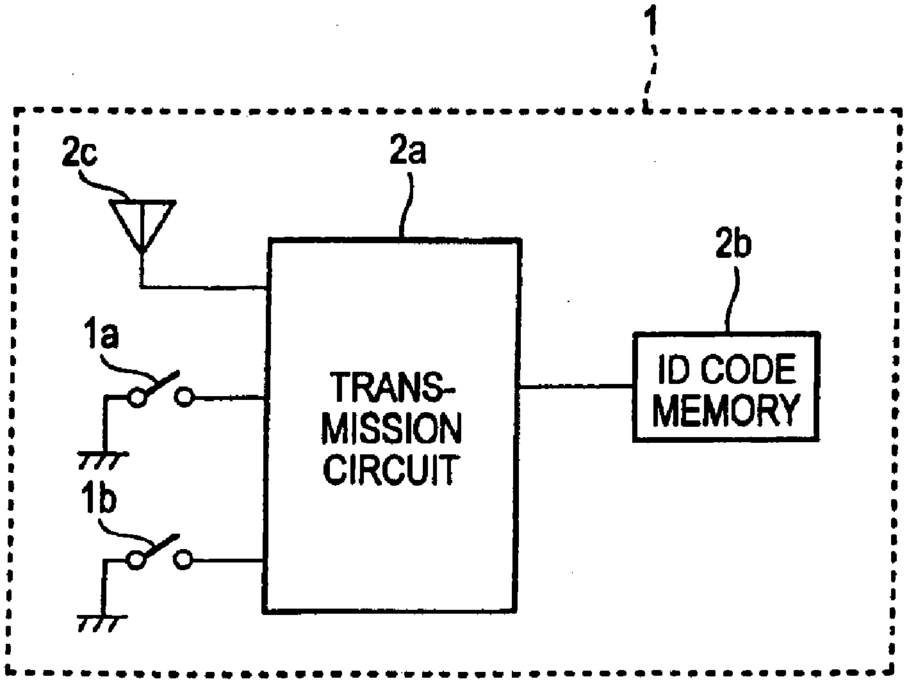
FIG. 6 PRIOR ART
FIG. 6 is a block diagram of a circuit incorporated in the portable key shown in FIG. 5.

In the configuration, the microcomputer 31*d* then performs processes for the door locking function and the door unlocking function alternately. Since the processes for operating the door locking or unlocking function have been already known, no description will be made herein. A flow chart for explaining the operation of the power window function will be described with reference to FIG. 4.

When electric power is supplied to the device shown in FIG. 2, the process proceeds from step ST100 to the next step ST110, and steps ST110 and ST120 that form a loop are alternately repeated until the ignition switch 56 is turned off.

When the driver turns the ignition switch 56 off to get off the vehicle, the process proceeds to step ST130 to start the timer 31*c* to perform the operation of measuring the predetermined time (timer time). The process then proceeds to step ST140 to enter a loop of steps ST140 and ST150. The loop of steps ST140 and ST150 is executed only during the timer time of the timer 31*c*, so that enable signals for enabling the power window function are supplied to the driver's seat power window controller 40, the assistant driver's seat power window controller 41, the right rear seat power window controller 42 and the left rear seat power window controller 43 respectively only during the loop. Accordingly, the driver can operate the power window function with the power window switches.

When a decision is made at the step ST150 that the timer time has passed, the process proceeds to the next step ST160 at which the microcomputer 31*d* of the main controller 31 transmits a request signal to the portable key 6. At the next step ST170, the microcomputer 31*d* determines whether a response signal is received or not. When a response signal is not received at step ST170, the microcomputer 31*d* proceeds the process to step ST200.

When a response signal is received at step ST170, the ID code forming the response signal is compared with the ID code stored in the ID code memory 31*b* (step ST180). When these ID codes agree with each other, the microcomputer 31*d* makes a decision that the driver is still present in the cabin or its vicinity, within a communicable area, and makes a decision that the power window function may be used.

As a result, the process proceeds to step ST190 at which the timer 31*c* is reset by the microcomputer 31*d*. The process then returns to the step ST130 so that the operation is repeated until ID code check at step ST180 is disabled, that is, until the driver goes out of the communicable area. As a result, the microcomputer 31*d* of the main controller 31 makes a decision that the driver is in the communicable area of the interior antenna 48*c*, and extends the timer time during which the driver's seat power window controller 40, the assistant driver's seat power window controller 41, the right rear seat power window controller 42 and the left rear seat power window controller 43 can be operated. Accordingly, the driver can operate the power windows at ease and in no hurry after doing some work in the cabin.

When the check at step ST180 results in disagreement of the received ID code with the ID code stored in the ID code memory 31*b*, the process proceeds to step ST200 at which the enable signals for enabling the power window function are restrained from being supplied to the driver's seat power window controller 40, the assistant driver's seat power window controller 41, the right rear seat power window controller 42 and the left rear seat power window controller 43 respectively. As a result, the power window controllers are disabled from handling. The process is then terminated at the next step ST210.

Although the embodiment has been described focused on power windows function by way of example, it is a matter of course that the power windows function are not necessarily essential to the invention, and that the invention may be applied to on-vehicle electronic apparatuses such as car stereo systems and car navigation systems.

Although the embodiment has been described on the case where a request signal is sent to the portable key 6 through the driver's seat side antenna 48*a*, the assistant driver's seat side antenna 48*b* and the interior antenna 48*c*, configuration may be made so that the request signal is sent only through the interior antenna 48*c*. In the alternate configuration, there needs to be configured so that the request signal is sent only through the interior antenna 48*c* when the microcomputer 31*d* makes a determination on the basis of the on/off states of the ignition switch 56 and the switches 49, 50, 53 and 54, that is, makes a decision that the passenger has not locked the doors with the portable key 6.

As a result, the power windows can be operated at any time only when the passenger is in the cabin, so that the passenger can work pleasantly with ease.

According to the invention, an electric device mounted on a vehicle such as power windows, a car stereo system and a car navigation system can be controlled at any time when the portable key is in the cabin (when the driver is in the cabin) or its vicinity (when the driver is in a neighbor of a door of the vehicle).

Since the verification of the ID code is always performed intermittently at regular time intervals to extend the operable time, the power window can be controlled instantaneously without any loss of time when the passenger operates the power window switch.

Hereinabove, the embodiment has been described on the case where the extension of the timer time, which is a time period that enables the manual operation of the power windows by the driver, is performed by the microcomputer 31*d*. However, as for an alternate configuration, it is also preferable to provide the timer 31*c* for each of the power window controllers 40, 41, 42, and 43 instead of providing the timer 31*c* within the main controller 31. In the alternate configuration, the microcomputer 31*d* is configured to output the enable signal at predetermined intervals when the portable key 1 is located within the communicatable range and each of the power window controllers 40, 41, 42, and 43 are configured to enable the power window function for a predetermined time period when the enable signal is input from the microcomputer 31*d*. In the alternate configuration the advantage of the aforementioned embodiment can be achieved.

In the alternate configuration, it is preferable to set the time period to enable the power window function longer than the intervals of the output of the enable signal so that the power window function is assuredly enabled while the portable key 1 is located within the communicatable range.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A wireless communication system for a vehicle, comprising:

a portable transmitter-receiver adapted to communicate information wirelessly;

a main controller mounted on the vehicle, the main controller adapted to communicate information wirelessly with the portable transmitter-receiver, to determine whether the portable transmitter-receiver is located within a communicatable range, and to output an enable signal when the portable transmitter-receiver is located within the communicatable range; and a sub-controller mounted on the vehicle and connected to the main controller, the sub-controller adapted to enable control of a vehicle mounted electronic device when the enable signal is input from the main controller, wherein the sub-controller comprises an operation input section adapted to input manual operation for controlling the vehicle mounted electronic device, wherein the sub-controller enables controlling of the vehicle mounted electronic device based on the manual operation input by the operation input section when the enable signal is input from the main controller, and disables controlling of the vehicle mounted electronic device based on the manual operation input by the operation input section when no enable signal is input from the main controller, wherein the main controller outputs the enable signal at predetermined intervals when the portable transmitter-receiver is located within the communicatable range, wherein the sub-controller enables controlling of the vehicle mounted electronic device based on the manual operation input by the operation input selection for a predetermined time period when the enable signal is input from the main controller, and wherein, when the predetetermined time period has been reached, the main controller queries the portable transmitter-receiver again to determine if the portable transmitter-receiver is located within the communicatable range, and if so, the main controller outputs the enable signal again so that the sub-controller will allow manual operation input by the operation input section for another predetermined time period that occurs immediately after the predetermined time period has ended.

2. The wireless communication system as claimed in claim 1, wherein the vehicle mounted electronic device comprises a motor for driving a power window of the vehicle, and wherein the operation input section comprises a switch for controlling the motor.

3. The wireless communication system as claimed in claim 1, wherein the time period is longer than the intervals of the output of the enable signal.

4. The wireless communication system as claimed in claim 1, wherein the information transmitted from the portable transmitter-receiver to the main controller includes an ID code set uniquely to the portable transmitter-receiver, and wherein the main controller outputs the enable signal when he ID code is determined to be valid.

5. The wireless communication system as claimed in claim 4, wherein the main controller transmits a request signal to the portable transmitter-receiver for requesting a transmission of the ID code in a predetermined period.

6. The wireless communication system as claimed in claim 1, wherein the sub-controller enables controlling of the vehicle mounted electronic device based on the manual operation input by the operation input section when the enable signal is input from the main controller, irrespective as to whether or not a vehicle operation has physically input a manual operation command on a particular location on the vehicle.

* * * * *